United States Patent [19]

Cully

[11] 4,147,373

[45] Apr. 3, 1979

[54] VEHICLE TOW TRAILER

[76] Inventor: Edward L. Cully, Rte. 1, Box 139, Van Wert, Ohio 45891

[21] Appl. No.: 829,270

[22] Filed: Aug. 31, 1977

[51] Int. Cl.² .............................................. B60P 3/12
[52] U.S. Cl. ................................... 280/445; 414/490; 280/402; 280/476 R
[58] Field of Search ............... 280/402, 442, 443, 444, 280/445, 423 A, 476 R, DIG. 9, DIG. 11; 214/86 A, 505, 506

[56] References Cited

U.S. PATENT DOCUMENTS

| | | | |
|---|---|---|---|
| 1,507,335 | 9/1924 | Clayton | 280/445 |
| 2,232,550 | 2/1941 | McNamara | 280/445 |
| 2,541,582 | 2/1951 | Hawkins | 280/402 |
| 2,661,856 | 12/1953 | Stanley | 214/334 |
| 2,701,069 | 2/1955 | Hawkins | 214/86 A |
| 3,494,635 | 2/1970 | Denny | 280/402 |
| 3,536,338 | 10/1970 | Stueven | 280/445 X |
| 3,547,290 | 12/1970 | Fratzke | 214/86 A |
| 3,613,921 | 10/1971 | Ryden | 280/443 X |
| 3,653,680 | 4/1974 | Denny | 280/402 |

Primary Examiner—Joseph F. Peters, Jr.
Assistant Examiner—R. Schrecengost
Attorney, Agent, or Firm—Wilson, Fraser & Clemens

[57] ABSTRACT

A vehicle tow trailer particularly useful for farm vehicles such as tractors or combines having an underslung frame with cradles for receiving the front wheels of the vehicle. The trailer is arranged with steerable wheels which track the angular relationship of a tow bar. Light weight towing vehicles can tow heavy equipment by arranging the cradles to position the axes of rotation of the trailer supported wheels of the towed vehicle ahead of the axis of rotation of the trailer wheels thereby loading the towing vehicle through the tow bar to give it better traction. The towed vehicle is afforded an abutment bar near the center of the cradle supported wheels to prevent the overrun of the towed vehicle on the towing vehicle and to provide a means for securing the towed vehicle to the trailer as by a chain. The underslung trailer body has skids on its underbody to facilitate traversing rough terrain as where a trailer wheel falls into a hole. The frame of the body is arranged to augment the skid surfaces as a ground support. A locking mechanism for the steerable wheels comprises telescoped rod sections having one end coupled to the tow bar and the other to the abutment bar. A lock release for the steering mechanism of a loaded trailer comprises a shearpin which impedes telescopic motion between the rod sections. Abutment pads selectively securable to the abutment bar permit the trailer cradles to accommodate towed vehicles having a range of wheel diameters.

6 Claims, 5 Drawing Figures

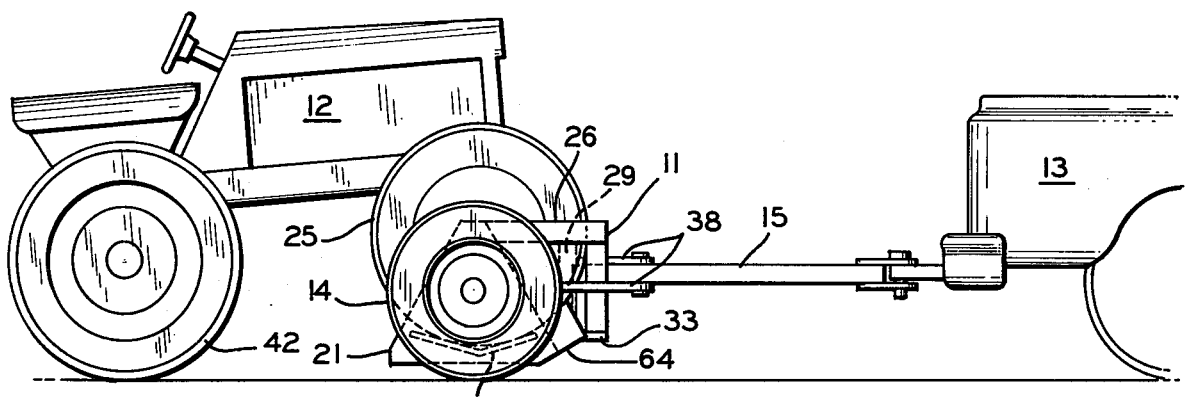
FIG. 1
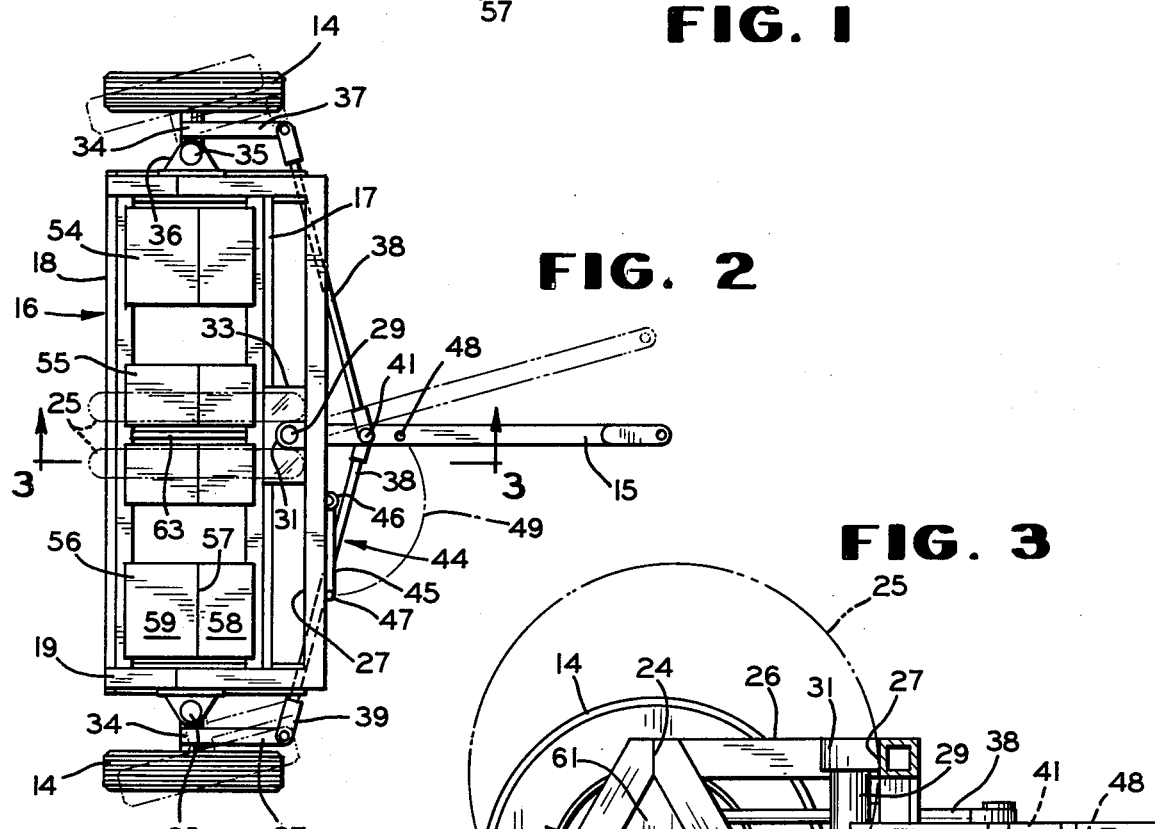
FIG. 2
FIG. 3
FIG. 4
FIG. 5

VEHICLE TOW TRAILER

BACKGROUND OF THE INVENTION

1. Field of the Invention

This invention relates to trailers for towed vehicles and more particularly to single axel trailers of the type which support only one pair of vehicle wheels. It is particularly directed to steerable trailers for farm vehicles such as tractors where the front wheels of the tractor are supported and the trailer is towed as by a truck while the rear tractor wheels support the remainder of the vehicle weight on the ground or road surface.

2. Description of the Prior Art

Heretofore it has been known to transport tractors by placing only their front wheels on a single axel trailer. Stanley et al. U.S. Pat. No. 2,661,856 of Dec. 8, 1953 discloses a mechanism styled "Dolly for supporting Tractor Front Wheels". Stanley et al. are concerned with a tricycle type tractor and hence their dolly has a narrow track and can have its axis of rotation of its wheels fixed normal to the draw bar of the dolly. The dolly includes a cradle for the tractor front wheels and a front chock plate against which the wheels are secured as by a length of chain.

In Denny U.S. Pat. No. 3,494,635 of Feb. 10, 1970 entitled "Vehicle Tow Trailer" and U.S. Pat. No. 3,653,680 of Apr. 4, 1972 entitled "Tow Trailer With Folding Carrier Platform" single axel trailers with steerable wheels are shown having rearwardly extensible vehicle support elements as might be employed to support one end of a disabled vehicle having the wheels on the other end operative for rolling support of the vehicle. Denny teaches a steering mechanism for the trailer wheels to cause them to track the angular relationship of a tow bar or draft bar with respect to the transverse axis of the trailer and means to lock the steering mechanism and tow bar relationship normal to the transverse axis of the trailer.

Farmers frequently work widly spaced fields under circumstances which require the transportation of working vehicles such as a farm tractor or combine together with a conventional over-the-road vehicle such as a pickup truck by a single man. Where a wide tread vehicle is to be transported it is desirable that the single axel trailer employed have steerable wheels thereby effectively converting the working vehicle to a four wheel trailer. Such trailers should be low to enable the wheels of the vehicle to be towed to be driven up on the trailer. It therefor has low ground clearance, a disadvantage on severe roads and rough terrain. Prior art devices have not offered a secure mount for the towed vehicle wheels nor suitable means to overcome difficult terrain.

An object of the present invention is to improve trailers for towed vehicles particularly rough terrain trailers of the single axel type.

Another object of the invention is to more securely retain the wheels of towed vehicles in a wheel support on a trailer.

A third object is to insure a single axel trailer for a towed vehicle will effectively steer that vehicle even when steering mechanism for the trailer has not been made operative.

A fourth object is to enable an underslung trailer to operate over rough terrain by skidding relationship with the underlying terrain.

A fifth object is to accommodate a range of towed vehicle wheels in abutting engagement with wheel supports on a towed vehicle.

SUMMARY OF THE INVENTION

The present invention features a single axel trailer having an abutment bar against which the wheels of a towed vehicle are abutted and to which the vehicle is secured. The trailer is made up of a frame which is underslung with respect to its wheel axel to afford easy access and convenient towing for vehicles having implements secured behind them. Thus a tractor can be towed over the road between fields with its front end raised only slightly and with ground working implements secured to its hitch. In such arrangements, the vehicle trailer and tractor are effectively an unattended four wheel trailer where the vehicle trailer wheels are steerable as by linkages causing the wheels to track the pivoted draw bar. The abutment bar is arranged integral with the vehicle trailer frame and is located at about the front axle height of the towed vehicle to provide a rugged and positive stop so that upon the braking of the towing vehicle at over-the-road speeds, the towed vehicle will be constrained and will not override the vehicle transport trailer or the towing vehicle.

The draw bar of the vehicle transport trailer is pivoted around a fixed generally vertical axis which can be secured to the abutment bar and a lower beam supporting wheel cradles on the trailer. Increased traction for the towing vehicle is afforded through the draw bar to the towing vehicle hitch by locating the wheel support cradles to position the axis of rotation of the supported wheels of the towed vehicle ahead of the vehicle transport trailer wheel axel. This downward movement is adjustable while maintaining an abutting relationship between the towed vehicle and trailer by the provision of abutment blocks which can be selectively positioned along the abutment bar to be in alignment with the towed vehicle wheels so that they are abutted against the blocks which bear against the bar. The conventional vehicle securing means maintains this relationship during vehicle transport. These abutment blocks also enable different vehicles having different supported wheel diameters to be accommodated by a given trailer.

When the trailer is being transported without a vehicle load it is desirable to lock the steerable wheels and the drawbar with respect to the trailer frame. However, damage could result if the lock were maintained inadvertently when the trailer was loaded with a vehicle. A releasable lock has been provided for the steerable wheels and drawbar. It comprises a rod having two telescoping sections joined by a shear pin which inhibits telescopic motion between the sections. The lock bar can be pivotally mounted on one of the drawbar and frame and pinned or otherwise releasably secured to the other of the drawbar and frame so that under forces imposed by an unloaded trailer it maintains the drawbar angle to the frame and through the steering linkage from the drawbar the wheel angular relationship to the frame. However, in the loaded condition the forces imposed, as when the towed vehicle turns, will shear the shear pin thereby permitting the draw-bar angle to shift around its pivot axis and steer the wheels.

Another feature of the invention is the provision of skids to facilitate trailing the trailer over terrain which contacts its underbody. Skids are integral with the frame structure as portions of trusses making up the side frames adjacent the trailer wheels. Angle iron is fabricated with flat faces downward to provide skid support faces and the leading ends of those angle iron elements are turned upward to present an inclined face to the terrain tending to lift the trailer as it is drawn forward. Cross members of the frame augment these skids by presenting broad faces to the terrain in the general plane of the skids. In particular, a forward transverse box beam has a flat side secured in the general plane of the inclined face and at the foremost portions of the opposed skids while a second transverse box beam is secured at the rearmost portions of the skids generally in the skid plane.

BRIEF DESCRIPTION OF THE DRAWING

FIG. 1 is a side elevational view of the vehicle transport trailer of this invention showing a farm tractor with its front wheels mounted on the trailer and showing a pickup truck as the towing vehicle for the trailer;

FIG. 2 is a plan view of the trailer of FIG. 1 alone, the tractor wheel locations for a tricycle type tractor are shown in phantom. Also, the drawbar and wheels are shown phantomed in a cocked position as when turning the trailer, and the arc through which the drawbar lock is swung from its stored to its locking position is shown in phantom;

FIG. 3 is a sectional elevational view of the trailer of FIG. 2, taken along the line 3—3 of FIG. 2 with a portion of the drawbar broken away;

FIG. 4 is a schematic, fragmentary section of the wheel cradle and abutment bar with a typical wheel accomodated by an abutment block; and FIG. 5 is a fragmentary, partially sectioned view of the telescoped portions of the lock rod showing a typical shear pin arrangement.

DETAILED DESCRIPTION OF THE PREFERRED EMBODIMENT

A vehicle transport trailer 11 for vehicles such as a farm tractor 12 and adapted for travel over-the-road and over rough terrain when towed as by a pickup truck 13 is shown in FIG. 1 as illustrative of this invention. The trailer 11 has a single axis for its wheels 14 which is normal to the conventional direction of transport so that for its unloaded transport, its drawbar 15 and wheels 14 are maintained fixed in planes parallel to the transport direction and normal to the wheel axis of rotation or axel. When employed to transport vehicles the trailer 11 in combination with the vehicle to be transported 12 constitutes a four wheel trailer form and is accommodated by providing means to pivot the draw bar 15 and wheels 14 in a motion following the towing vehicle.

The trailer generally comprises a frame 16 made up of a front and rear generally horizontal transverse lower beams 17 and 18 respectively joined by opposed frame sides 19. Sides 19 are in the form of a truss having an L section base 21, and front and rear upstanding and converging box members 22 and 23 joined at their upper end 24. Advantageously the frame is underslung with respect to the axes of the trailer wheels 14 and the top of the truss is generally at or above the level of the axel of the wheel 25 of the vehicle which is to be carried. A box beam 26 extends forward from the junction 24 of beams 22 and 23 to support an abuttment bar 27 against which the towed vehicle wheel is abutted either directly or, as shown in FIG. 4, through the intermediary of an abutment block 28.

A draft member or drawbar 15 is pivotally carried at its rear end on a pivoted column 29 mounted in journals 31 and 32 secured to the abutment bar 27 and a bottom plate 33 extending forward from lower beam 17. Drawbar 15 is free for swinging movement around the generally vertical axis of pivoted column 29 and is rigidly secured to the trailer frame 16 so far as motion relative thereto in the vertical plane is concerned. This rigid relationship is utilized to load the driving wheels of the draft vehicle and enhance their traction.

An auto type steering mechanism is provided for the trailer wheels. Each wheel 14 is carried on a spindle 34 including a vertically disposed king pin 35 journaled on a vertical axis in a journal 36 carried on the outer side of frame side 19. Each spindle has a forwardly extending arm 37 rigidly secured thereto. These arms are cross-connected by a transverse tie-rod 38, the outer ends of the tie-rods being pivotally connected to the forward ends of steering arms 37 through clevis 39 which may be threaded to the tie-rods for length adjustment of the steering linkage.

The ends of the tie-rods 38 remote from steering arms 37 are pivotally connected to drawbar 15 either directly or through brackets as by means of pivot pins 41. In this manner, the pivotal movement of draw bar 15 causes lateral swinging movement of steering arms 37 and thus the spindles 34 to cause the plane of rotation of the wheels to track the drawbar. The drawbar 15 constitutes a main steering means operable to steer the wheels 14 when it is free to pivot.

While it is desirable to steer wheels 14 when a vehicle to be transported is mounted on the trailer 11, such freedom of motion would be highly undesirable when the trailer is being transported unloaded. The loaded trailer is effectively a four wheel trailer with the ground engaged wheels 42 of the transported vehicle tantamount to the rear trailer wheels, thus, the steering of the front wheels enables the four wheel rig to track. As a two wheel trailer, such freedom would permit slewing of the trailer out of the track of the towing vehicle. This is avoided by engaging a lock mechanism 44 for the steering.

The lock mechanism 44 maintains the drawbar 15 parallel to the longitudinal axis of the trailer by establishing a triangular link from the abutment bar 27 to the drawbar 15. The link is in the form of a rod 45 shown pivotally mounted in bracket 46 on the front face of abutment bar 27. A clip 47 also on that face retains the rod 45 in an inoperative position while the steering is unlocked. The free end of rod 45 has a coupling which can be a pin (not shown) adapted to be dropped into an aperture 48 in drawbar 15 when the end is released from its clip 47 and swung through arc 49, shown in phantom in FIG. 2 to place the latch pin in aperture 48.

A safety release of the steering lock is shown in FIG. 5. Rod 45 includes an outer tube section 51 in which is telescoped an inner section 52 which is telescopically moveable within tube 51 over a range of length required for steering the trailer. Telescopic motion between sections 51 and 52 is ordinarily prevented by a shear pin 53 which fits through registering apertures 54 and 55 in the outer and inner sections. The pin is of a nature to withstand forces imposed by towing an unloaded trailer with the steering locked. However, the greater forces imposed when turning the towing vehicle while towing a loaded trailer will shear pin 53 thereby freeing sections 51 and 52 for telescopic motion and the drawbar 15 for pivotal motion and steering.

Relative location of the trailer wheel axel, the spindles 34, and the concentration of load on the trailer is provided by means of wheel cradles 54, 55 and 56 to develop the downward moment on drawbar 15. The cradles have their lowest point, an apex 57, where the cradles are made up of flat plates 58 and 59 in a vertical plane transverse of the trailer which is forward of the vertical plane in which the spindles are mounted. The spindle journals are secured to gussets 61 in the side trusses. Plates 58 and 59 are secured to the front and rear cross beams 22 and 23 of frame 16.

The wheels of the transported vehicles should be maintained low for convenience in loading and stability as well as road clearance on rearwardly extending overhanging elements such as ground working implements. The abutment bar should be high to minimize the chances of the transport vehicle overriding. Advantageously the abutment bar is above the cradle about the radius of the largest wheel to be accomodated and is sufficiently forward of the spindles to accomodate the radius of that wheel plus the distance required to develop the desired downward moment on drawbar 15. A large wheel is shown in FIG. 3 with this relationship maintained.

Where a wheel of less than capacity diameter is mounted in the cradles 54, 55 or 56 or where the downward moment is excessive and it is desired to move the load rearward, a spacer can be mounted between the abutment bar 27 and the wheel 25. One such spacer is an abutment block 28 as shown in FIG. 4 in the general cross section of a G arranged with detents in the form of pins 62 adapted to be fitted within apertures positioned at suitable spaced intervals along the front face of the box beam forming abutment bar 27. The abutment blocks can then be positioned in alignment with the wheels and thus above the cradles to engage and block forward motion of the wheels.

Rearward motion of the transported vehicle is prevented by securing a chain (not shown) around the abutment bar 27 and the wheel spindle or frame of the vehicle.

Vehicles with four wheel suspensions are mounted with their wheels on outboard cradles 54 and 56 while tricycle vehicles are mounted with their wheels on center cradle 55 as shown in phantom in FIG. 2. In order to further stabilize tricycle vehicles a web 63 is arranged to fit between the closely spaced wheels of a typical tricycle suspension. Web 56 can be welded in the cradle center and thus the trailer center to militate against lateral motion of the transported vehicle.

The underslung construction of trailer 11 provides a relatively low clearance of its underbody. Thus the trailer might become hung up on rough terrain or if one of its wheels drops in a hole. Skids are provided to prevent or aid in overcoming such difficulties. These skids are constituted by truss base 21 on each frame side 19 as an angle iron member having its front end 64 turned upward to present a favorable angle of attack to any ground interference. This angle of attack is maintained across the entire lower forward face of the trailer since front box beam 17 is arranged to present a flat face 65 of substantial extent in essentially the plane of end 64 and functions as a skid element across the width of the trailer. Rear bottom beam 18 also is located with portions generally in the plane of the skid surfaces to augment the ground support where required.

It should be noted that the lower faces of the apices 57 of cradles 54, 55 and 56 and thus the lower extremities of those cradles are above the skid faces and protected thereby.

The preceding description is intended as illustrative of the invention. However, it is to be appreciated that details of construction can be varied without departing from the spirit and scope of invention here contemplated.

What I claim is:

1. A vehicle tow trailer for accomodating a set of towed vehicle wheels comprising:
   a front and rear generally horizontally extending transverse lower frame member;
   opposed frame sides upstanding from and secured adjacent the ends of said transverse lower frame members; said sides each including a portion extending forwardly of the frame;
   an abutment bar extending between and secured to said opposed forwardly extending portions;
   wheel cradles extending between and secured to said transverse lower frame members;
   a pair of selectively steerable wheels secured to said framesides supporting said frame and having their axes of rotation above said cradles and rearward on said frame from a vertical plane of projection of the axes of rotation of wheels of vehicles adapted to be towed on said trailer when said towed vehicle wheels are mounted in said cradles for towing;
   said abuttment bar having a horizontal plane of projection at a height above said cradles approximately the radius of the cradle mounted wheels of the towed vehicle;
   said abutment bar having a vertical plane of projection at a location ahead of the vertical plane of projection of the axes of rotation of said steerable wheels whereby the axes of rotation of the cradle mounted wheels of the towed vehicle are ahead of the axes of rotation of said steerable wheels to impose a downward moment on said cradles and frame ahead of the axes of rotation of said steerable wheels;
   a drawbar; a pivotal coupling between said frame and said drawbar having a generally vertical, fixed pivot axis on said frame whereby the downward moment imposed by towed vehicle wheels in said cradles is imposed on a towing vehicle;
   a steering linkage from said drawbar to said steerable wheels arranged to cause said wheels to track said drawbar in their angular relationships to said frame;
   skids formed of the lower structural elements of said opposed frame sides adjacent said steerable wheels and of said front and rear transverse lower frame members, said skids having a front upwardly inclined length ahead of the location of support of said wheels on said frame, and a generally horizontal length adjacent said wheels, and said front and rear transverse frame members having generally flat surfaces respectively coplanar with and adjacent to said inclined and horizontal lengths; and
   means to lock the angular relationship of said wheels to said frame.

2. A vehicle tow trailer according to claim 1 wherein said pivotal coupling is secured to said front transverse lower frame member and said abutment bar.

3. A vehicle tow trailer for accomodating a set of towed vehicle wheels comprising:
   a front and rear generally horizontally extending transverse lower frame member;

opposed frame sides upstanding from and secured adjacent the ends of said transverse lower frame members; said sides each including a portion extending forwardly of the frame;

an abutment bar extending between and secured to said opposed forwardly extending portions;

wheel cradles extending between and secured to said transverse lower frame members;

a pair of selectively steerable wheels secured to said frame sides supporting said frame and having their axes of rotation above said cradles and rearward on said frame from a vertical plane of projection of the axes of rotation of wheels of vehicles adapted to be towed on said trailer when said towed vehicle wheels are mounted in said cradles for towing;

said abutment bar having a horizontal plane of projection at a height above said cradles approximately the radius of the cradle mounted wheels of the towed vehicle;

said abutment bar having a vertical plane of projection at a location ahead of the vertical plane of projection of the axes of rotation of said steerable wheels whereby the axes of rotation of the cradle mounted wheels of the towed vehicle are ahead of the axes of rotation of said steerable wheels to impose a downward moment on said cradles and frame ahead of the axes of rotation of said steerable wheels;

a drawbar; a pivotal coupling between said frame and said drawbar having a generally vertical, fixed pivot axis on said frame whereby the downward moment imposed by towed vehicle wheels in said cradles is imposed on a towing vehicle;

a steering linkage from said drawbar to said steerable wheels arranged to cause said wheels to track said drawbar in their angular relationships to said frame;

means to lock the angular relationship of said wheels to said frame; and a safety release for said lock means operative to release said wheels to a steerable condition when a vehicle to be towed is located on said trailer and a pivoting force is imposed on said drawbar.

4. A vehicle tow trailer according to claim 3 wherein said lock means is a rod including a first rod section telescoped within a second rod section, one end of said rod being pivotally coupled to one of said abutment bar and said drawbar and the other end of said rod being releasably secured to the other one of said abutment bar and said drawbar; and wherein said safety release is a shear pin for impeding telescopic motion between said first and second rod sections.

5. A vehicle tow trailer for accomodating a set of towed vehicle wheels comprising:

a front and rear generally horizontally extending transverse lower frame member;

opposed frame sides upstanding from and secured adjacent the ends of said transverse lower frame members; said sides each including a portion extending forwardly of the frame;

an abutment bar extending between and secured to said opposed forwardly extending portions;

wheel cradles extending between and secured to said transverse lower frame members;

a pair of selectively steerable wheels secured to said frame sides supporting said frame and having their axes of rotation above said cradles and rearward on said frame from a vertical plane of projection of the axes of rotation of wheels of vehicles adapted to be towed on said trailer when said towed vehicle wheels are mounted in said cradles for towing;

said abutment bar having a horizontal plane of projection at a height above said cradles approximately the radius of the cradle mounted wheels of the towed vehicle;

said abutment bar having a vertical plane of projection at a location ahead of the vertical plane of projection of the axes of rotation of said steerable wheels whereby the axes of rotation of the cradle mounted wheels of the towed vehicle are ahead of the axes of rotation of said steerable wheels to impose a downward moment on said cradles and frame ahead of the axes of rotation of said steerable wheels;

a drawbar; a pivotal coupling between said frame and said drawbar having a generally vertical, fixed pivot axis on said frame whereby the downward moment imposed by towed vehicle wheels in said cradles is imposed on a towing vehicle;

a steering linkage from said drawbar to said steerable wheels arranged to cause said wheels to track said drawbar in their angular relationships to said frame;

means to lock the angular relationship of said wheels to said frame;

a wheel cradle centered between said frame sides and adapted to accomodate the front wheels of a tricycle type tractor; and a web extending front-to-rear across the center of said cradle adapted to be straddled by said tractor front wheels.

6. A vehicle tow trailer for accomodating a set of towed vehicle wheels comprising:

a front and rear generally horizontally extending transverse lower frame member;

opposed frame sides upstanding from and secured adjacent the ends of said transverse lower frame members; said sides each including a portion extending forwardly of the frame;

an abutment bar extending between and secured to said opposed forwardly extending portions;

wheel cradles extending between and secured to said transverse lower frame members;

a pair of selectively steerable wheels secured to said frame sides supporting said frame and having their axes of rotation above said cradles and rearward on said frame from a vertical plane of projection of the axes of rotation of wheels of vehicles adapted to be towed on said trailer when said towed vehicle wheels are mounted in said cradles for towing;

said abutment bar having a horizontal plane of projection at a height above said cradles approximately the radius of the cradle mounted wheels of the towed vehicle;

said abutment bar having a vertical plane of projection at a location ahead of the vertical plane of projection of the axes of rotation of said steerable wheels whereby the axes of rotation of the cradle mounted wheels of the towed vehicle are ahead of the axes of rotation of said steerable wheels to impose a downward moment on said cradles and frame ahead of the axes of rotation of said steerable wheels;

a drawbar; a pivotal coupling between said frame and said drawbar having a generally vertical, fixed pivot axis on said frame whereby the downward moment imposed by towed vehicle wheels in said cradles is imposed on a towing vehicle;

a steering linkage from said drawbar to said steerable wheels arranged to cause said wheels to track said drawbar in their angular relationships to said frame;

means to lock the angular relationship of said wheels to said frame; and abutment blocks adapted to be secured to said abutment bar above said cradles whereby the effective abutment surface for the cradle mounted wheels of a towed vehicle is moved rearwardly of said abutment bar.

* * * * *